(12) United States Patent
Amidi

(10) Patent No.: US 8,755,814 B2
(45) Date of Patent: Jun. 17, 2014

(54) METHOD AND APPARATUS FOR INTERMITTENT LOCATION REPORTING

(75) Inventor: Soroush Amidi, Montreal (CA)

(73) Assignee: Honeywell International Inc., Morristown, NJ (US)

( * ) Notice: Subject to any disclaimer, the term of this patent is extended or adjusted under 35 U.S.C. 154(b) by 712 days.

(21) Appl. No.: 12/183,964

(22) Filed: Jul. 31, 2008

(65) Prior Publication Data

US 2010/0026570 A1 Feb. 4, 2010

(51) Int. Cl.
*H04W 24/00* (2009.01)

(52) U.S. Cl.
USPC .................................... 455/456.1; 455/456.6

(58) Field of Classification Search
USPC .............................................. 455/456.1–457
See application file for complete search history.

(56) References Cited

U.S. PATENT DOCUMENTS

| | | |
|---|---|---|
| 5,051,741 A | 9/1991 | Wesby |
| 5,129,605 A * | 7/1992 | Burns et al. ...................... 246/5 |
| 6,021,330 A | 2/2000 | Vannucci |
| 6,034,603 A | 3/2000 | Steeves |
| 6,255,988 B1 | 7/2001 | Bischoff |
| 6,327,533 B1 | 12/2001 | Chou |
| 6,363,323 B1 * | 3/2002 | Jones ........................... 701/468 |
| 6,473,038 B2 | 10/2002 | Patwari et al. |
| 6,570,487 B1 | 5/2003 | Steeves |
| 6,850,502 B1 | 2/2005 | Kagan et al. |
| 6,961,541 B2 | 11/2005 | Overy et al. |
| 6,975,941 B1 | 12/2005 | Lau et al. |
| 7,005,985 B1 | 2/2006 | Steeves |
| 7,027,416 B1 | 4/2006 | Kriz |
| 7,286,158 B1 | 10/2007 | Griebenow |
| 7,366,522 B2 | 4/2008 | Thomas |
| 7,379,729 B2 | 5/2008 | Holland et al. |
| 7,515,917 B2 * | 4/2009 | Casey ......................... 455/456.1 |
| 7,518,499 B2 | 4/2009 | Werenka |
| 7,640,007 B2 | 12/2009 | Chen et al. |
| 7,853,250 B2 | 12/2010 | Harvey et al. |
| 8,223,012 B1 * | 7/2012 | Diem ......................... 340/539.13 |
| 2002/0077080 A1 * | 6/2002 | Greene .......................... 455/412 |
| 2002/0115436 A1 * | 8/2002 | Howell et al. ................. 455/426 |
| 2002/0142797 A1 * | 10/2002 | Tarighi et al. ................. 455/556 |
| 2004/0029558 A1 | 2/2004 | Liu |
| 2005/0128074 A1 | 6/2005 | Culpepper et al. |

(Continued)

FOREIGN PATENT DOCUMENTS

| | | |
|---|---|---|
| KR | 1020050108233 | 11/2005 |
| WO | WO2004-109317 A2 | 12/2004 |

OTHER PUBLICATIONS

Communication dated Dec. 15, 2011 in connection with European Patent Application No. EP 09 80 3407.

(Continued)

*Primary Examiner* — Marisol Figueroa

(57) ABSTRACT

A system, apparatus and method are provided for intermittent location reporting. The apparatus includes a global positioning system (GPS) receiver, a transceiver, and a controller. The transceiver is a WiFi or WiMAX transceiver. The controller reads a current geographical location of the apparatus and determines whether communication with a location monitoring application (LMA) is possible. If communication with the LMA is not possible, the controller stores the current geographical location. When communication with the LMA is again possible, the controller sends any stored geographical locations. The controller may store timestamps associated with the geographical locations. The controller may send the geographical locations to the LMA at intervals determined by predefined rules.

20 Claims, 4 Drawing Sheets

(56) References Cited

U.S. PATENT DOCUMENTS

| | | |
|---|---|---|
| 2005/0201349 A1 | 9/2005 | Budampati |
| 2005/0281215 A1 | 12/2005 | Budampati et al. |
| 2006/0002368 A1 | 1/2006 | Budampati et al. |
| 2006/0046664 A1 | 3/2006 | Paradiso et al. |
| 2006/0063523 A1 | 3/2006 | McFarland |
| 2006/0143292 A1 | 6/2006 | Taubenheim et al. |
| 2006/0171344 A1 | 8/2006 | Subramanian et al. |
| 2006/0171346 A1 | 8/2006 | Kolavennu et al. |
| 2006/0176169 A1 | 8/2006 | Doolin et al. |
| 2006/0227729 A1 | 10/2006 | Budampati et al. |
| 2006/0261940 A1 | 11/2006 | Defant et al. |
| 2006/0274644 A1 | 12/2006 | Budampati et al. |
| 2006/0274671 A1 | 12/2006 | Budampati et al. |
| 2006/0287001 A1 | 12/2006 | Budampati et al. |
| 2007/0030816 A1 | 2/2007 | Kolavennu |
| 2007/0030832 A1 | 2/2007 | Gonia et al. |
| 2007/0037588 A1 | 2/2007 | Mohi et al. |
| 2007/0076638 A1 | 4/2007 | Kore et al. |
| 2007/0077941 A1 | 4/2007 | Gonia et al. |
| 2007/0087763 A1 | 4/2007 | Budampati et al. |
| 2007/0091824 A1 | 4/2007 | Budampati et al. |
| 2007/0091825 A1 | 4/2007 | Budampati et al. |
| 2007/0132576 A1 | 6/2007 | Kolavennu et al. |
| 2007/0132577 A1 | 6/2007 | Kolavennu |
| 2007/0132637 A1 | 6/2007 | Kolavennu et al. |
| 2007/0155423 A1 | 7/2007 | Carmody et al. |
| 2007/0205886 A1 | 9/2007 | Huseth et al. |
| 2007/0241901 A1 | 10/2007 | Cage et al. |
| 2007/0241965 A1 | 10/2007 | Kolavennu et al. |
| 2007/0268884 A1 | 11/2007 | Kolavennu et al. |
| 2008/0076450 A1 | 3/2008 | Nanda et al. |
| 2008/0109098 A1 | 5/2008 | Moshier et al. |
| 2008/0109099 A1 | 5/2008 | Moshier |
| 2008/0122641 A1 | 5/2008 | Amidi |
| 2008/0123934 A1 | 5/2008 | Amidi |
| 2008/0209521 A1 | 8/2008 | Malaney |
| 2008/0234935 A1 | 9/2008 | Wolf et al. |
| 2008/0267259 A1 | 10/2008 | Budampati et al. |
| 2008/0273547 A1 | 11/2008 | Phinney |
| 2009/0009327 A1 | 1/2009 | Amidi |
| 2009/0010484 A1 | 1/2009 | Amidi |
| 2009/0021390 A1 | 1/2009 | Amidi |
| 2009/0115604 A1 | 5/2009 | Thomas et al. |
| 2009/0224970 A1* | 9/2009 | Tsau .................. 342/357.09 |

OTHER PUBLICATIONS

Jean-Christophe Cousin, et al., "An Indoor Positioning System Using GPS Repeaters and AOA Measurements", 18th International Technical Meeting of the Satellite Division, Sep. 13-16, 2005, p. 2743-2749.

Goran M. Djuknic, et al., Geolocation and Assisted-GPS, White Paper, Mobility: 3G-CDMA2000 & UMTS, Lucent Technologies, Bell Labs, May 31, 2002, 10 pages.

Office Action dated May 28, 2013 in connection with U.S. Appl. No. 12/183,263.

"IntelaTrac PKS Redefines Field Data Collection and Management," Honeywell, Feb. 2006, 2 pages.

Honeywell Process Solutions, "IntelaTrac PKS" Honeywell, 2 pages.

"Powerful Calibration Management with DocuMint," Honeywell, Mar. 2008, 4 pages.

"Lumidor Minimax XT," Honeywell, Dec. 2005, 4 pages.

"PanOS Platform, Unified Location Management Platform," PanGo, 2007, 2 pages.

"Ekahau T301-A Wi-Fi Tag," ekahau, 2007, 2 pages.

"Improve Maintenance Efforts with DocuMint," Honeywell, Feb. 2006, 3 pages.

Honeywell Process Solutions, "Mobile Station," Honeywell, 3 pages.

"WiMAX", http://en.wikipedia.org/wiki/Wimax, Aug. 20, 2008, 17 pages.

Dongyan Chen et al., "Dependability Enhancement for IEEE 802.11 Wireless LAN with Redundancy Techniques," Proceedings of the 2003 International Conference on Dependable Systems and Networks, 2003, 8 pages.

Dr. Soumitri Kolavennu, Presentation, "WNSIA MAC Layer", ISA SP100 meeting, Feb. 14, 2007, 24 pages, see esp. p. 17.

Soroush Amidi, "System and Method for Inventory Management", U.S. Appl. No. 12/024,267, filed Feb. 1, 2008.

Soroush Amidi, "Method and Apparatus for Location Detection Using GPS and WiFi/WiMAX", U.S. Appl. No. 12/183,876, filed Jul. 31, 2008.

Ramakrishna S. Budampati, et al., "Apparatus and Method for Deterministic Latency-Controlled Communications in Process Control Systems", U.S. Appl. No. 12/176,625, filed Jul. 21, 2008.

Office Action dated Apr. 11, 2014 in connection with U.S. Appl. No. 12/183,263, 33 pages.

* cited by examiner

METHOD AND APPARATUS FOR INTERMITTENT LOCATION REPORTING

TECHNICAL FIELD

This disclosure relates generally to a location detection device and more specifically to a method and apparatus for intermittent location reporting.

BACKGROUND

Processing facilities are often managed using process control systems. Example processing facilities include manufacturing plants, chemical plants, crude oil refineries, ore processing plants, and coal or other types of mines. A company or other business entity may have several, geographically separated processing facilities between which assets are moved.

Asset tracking systems may be used to track the locations of assets within a processing facility. These systems are routinely used as part of process control systems or security systems, allowing the systems to identify when assets enter predefined areas or when assets are moved to or from their designated locations.

SUMMARY

This disclosure provides a method and apparatus for intermittent location reporting.

In a first embodiment, a method includes reading a current geographical location of a location detecting device (LDD) and determining whether communication with a location monitoring application (LMA) is possible. The method also includes, if communication with the LMA is not possible, storing the current geographical location. The method further includes, if communication with the LMA is possible, sending any stored geographical locations and the current geographical location to the LMA.

In a second embodiment, an apparatus includes a global positioning system (GPS) receiver, a transceiver, and a controller. The transceiver comprises comprising a WiFi or WiMAX transceiver. The controller is adapted to read a current geographical location of the apparatus and determine whether communication with a location monitoring application (LMA) is possible. The controller is also adapted to store the current geographical location, if communication with the LMA is not possible. The controller is further adapted to send any stored geographical locations and the current geographical location to the LMA, if communication with the LMA is possible.

In a third embodiment, a system includes a location monitoring application (LMA), a network, and a location detecting device (LDD). The LDD includes a global positioning system (GPS) receiver, a transceiver that comprises a WiFi or WiMAX transceiver, and a controller. The controller is adapted to read a current geographical location of the LDD and determine whether communication with the location monitoring application (LMA) is possible. The controller is also adapted to store the current geographical location, if communication with the LMA is not possible. The controller is further adapted to send any stored geographical locations and the current geographical location to the LMA, if communication with the LMA is possible.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
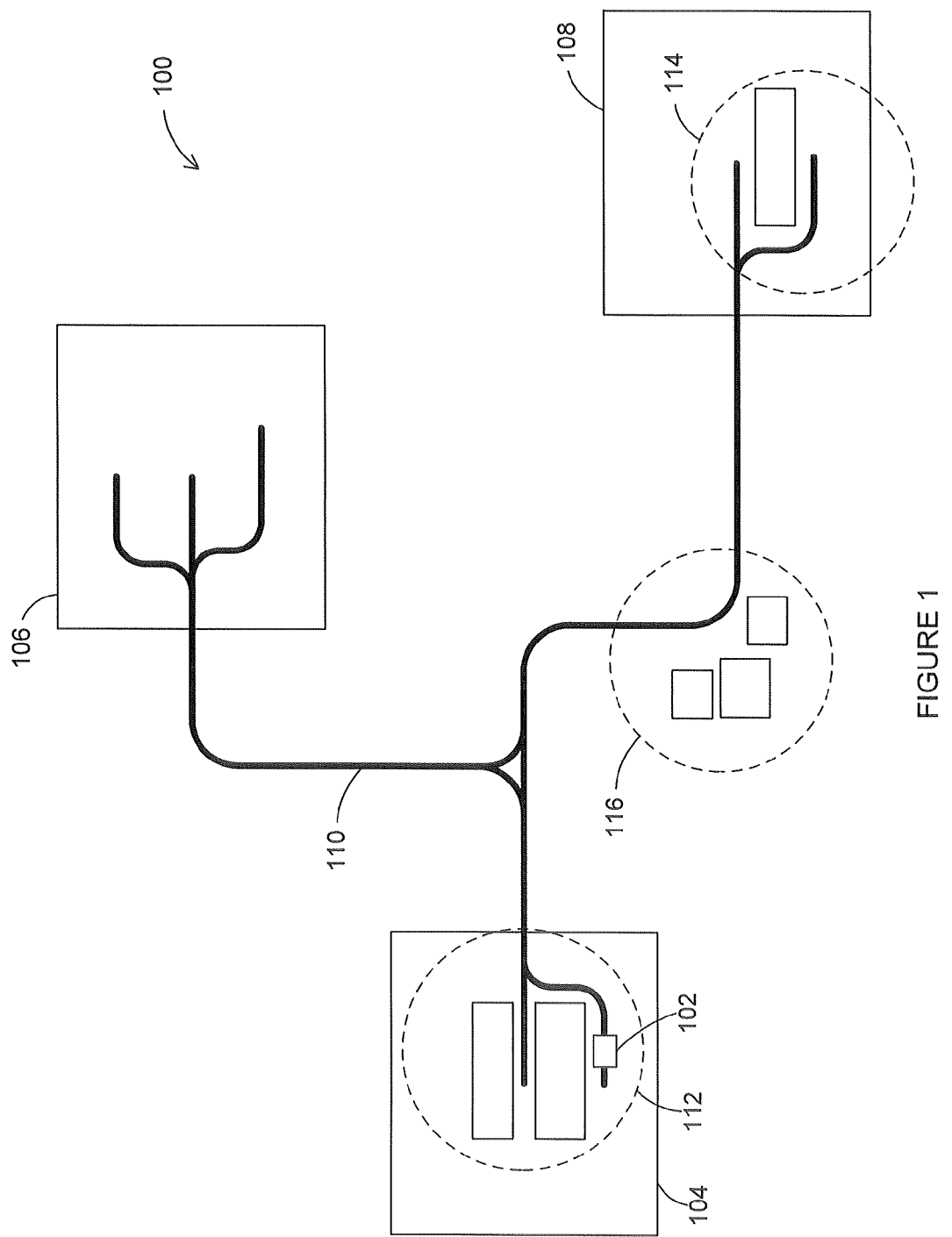
FIG. 1 presents a schematic overhead view of a system of processing facilities and a location detecting device according to this disclosure.

FIG. 1 presents a schematic overhead view of a system 100 of processing facilities and a location detecting device (LDD) 102 according to this disclosure. The LDD 102 is attached to an asset, which is located in a processing facility 104. The processing facility 104 is coupled to a switchyard 106 and a processing facility 108 by a system of train tracks 110.

The processing facilities 104 and 108 are equipped with wireless networks having coverage areas 112 and 114, respectively. The wireless networks 112 and 114 are communicatively coupled to a location monitoring application (LMA) (not shown in FIG. 1). In one embodiment, the LDD 102 communicates wirelessly with the wireless networks 112 and 114 using the IEEE 802.11 standard (referred to as a "WiFi standard"). In other embodiments, the LDD 102 communicates wirelessly with the wireless networks 112 and 114 using the IEEE 802.16 standard (referred to as a "WiMAX standard").

The LDD 102 is equipped with a global positioning system (GPS) receiver that is used to read a geographical location of the LDD 102. When the LDD 102 is located in the processing facility 104, in the coverage area 112, it is able to report its geographical location to the LMA at predetermined intervals as the asset is moved around the processing facility 104. When the LDD 102 is moved outside the coverage area 112, though, it determines that is no longer able to communicate with, and report its geographical location to, the LMA.

However, the LDD 102 continues to read and store its geographical location, as read from its GPS receiver, as it is moved along the train track 110. Along with each geographical location, the LDD 102 stores a timestamp associated with the location. When the LDD 102 reaches the processing facility 108 and enters the coverage area 114, it determines that communication with the wireless node 114 is possible. The LDD 102 then determines that the wireless node 114 is coupled to the LMA and that the LDD 102 is again able to communicate with the LMA. Upon making this determination, the LDD 102 reports its current geographical location to the LMA, as well as the stored geographical locations and timestamps that it accumulated since it left the coverage area 112.

In this way, the LMA is able to determine what route was taken in bringing the asset to which the LDD 102 is attached from the processing facility 104 to the processing facility 108.

For example, if the arrival of the LDD 102 in the processing facility 108 is later than expected, the LMA may determine that the asset was taken to the switchyard 106 for a period of time before being brought to the processing facility 108.

As the LDD 102 passes through a coverage area 116, it determines that communication with the wireless node 116 is possible. However, the LDD 102 then determines that wireless node 116 is not coupled to the LMA and does not attempt to report its current and stored geographical locations and timestamps to the LMA.

Whether moving within one of the processing facilities 104 and 108 or along the train tracks 110, the LDD 102 may report or store its geographical location according to any of several possible rules. Reporting or storing may be done at predefined time intervals or when the location has moved a predefined distance. The LDD 102 may store a database of geographical regions and report or store its location when it determines that it has moved from one region to another. The LDD 102 may use one rule when able to communicate its location to the LMA and another rule when unable to communicate its location to the LMA. The LDD 102 may use a rule selected by the LMA or sent to the LDD 102 by the LMA.

While only two processing facilities with associated wireless nodes are shown in FIG. 1, it will be understood that in other embodiments any number of wireless nodes at associated processing facilities may be coupled to the LMA. While the processing facilities 104 and 108 are shown with only a single wireless node and associated coverage area each, it will be understood that, in other embodiments, a processing facility may include a plurality of wireless networks with associated coverage areas. In such processing facilities, the LDD 102 may report or store its location when it determines that it has moved from one coverage area to another.

Figure 2:
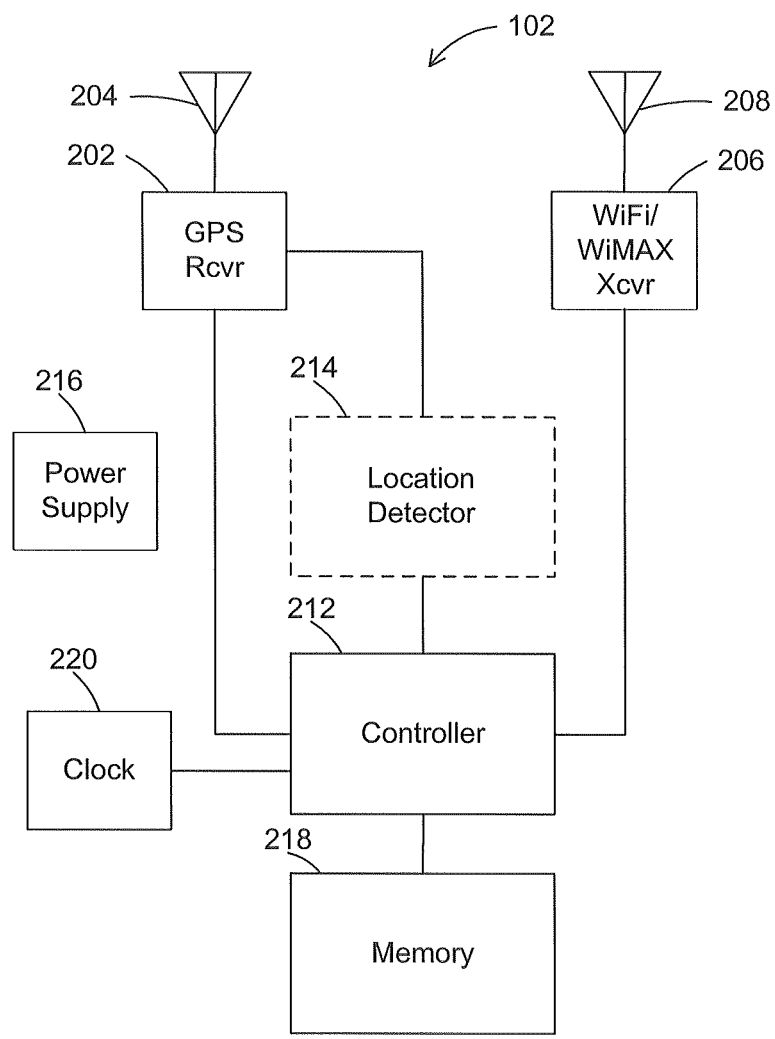
FIG. 2 presents a block diagram of a location detecting device according to this disclosure.

FIG. 2 presents a block diagram of the location detecting device (LDD) 102 according to this disclosure. The LDD 102 includes a global positioning system (GPS) receiver 202, which is coupled to a GPS antenna 204. The LDD 202 also includes a transceiver 206 coupled to an antenna 208. In some embodiments, the transceiver 206 is a WiFi transceiver; in other embodiments, the transceiver 206 is a WiMAX transceiver.

A controller 212 is coupled to the GPS receiver 202 and the transceiver 206. Based upon information received from the GPS receiver 202, the controller 112 determines a current geographical location of the LDD 102. At substantially the same time, the controller may also read from a clock 220 a timestamp that is associated with the geographical location just received from the GPS receiver 202.

The controller 212 is also coupled to the transceiver 206 and able to communicate wirelessly via the transceiver 206 to a nearby WiFi or WiMAX node. If the wireless node is coupled to a location monitoring application (LMA) (not shown in FIG. 2), the controller 212 is further able to communicate with the LMA via the transceiver 206 and the wireless node.

When the controller 212 is able to communicate with an LMA via the transceiver 206, the controller 212 sends the current geographical location and associated timestamp to the LMA via the transceiver 206. As described with reference to FIG. 1, the controller 212 may send this information to the LMA according to predefined rules.

In some embodiments, the controller 212 stores the current geographical location and associated timestamp in a memory 218 even while the controller 212 is able to communicate with the LMA. According to rule, at predefined intervals of time, the controller 212 sends any locations and timestamps stored during the interval to the LMA via the transceiver 206.

When the controller 212 is not able to communicate with an LMA via the transceiver 206, it stores geographical locations received from the GPS receiver 202 and associated timestamps read from the clock 220 in the memory 218, for deferred sending to the LMA. When the controller 212 is again able to communicate with the LMA via the transceiver 206, the controller 212 sends any stored locations and timestamps to the LMA via the transceiver 206.

In some embodiments, the LDD 102 includes a location detector 214, coupled to the GPS receiver 202 and the controller 212. The controller 212 uses the location detector 214 to calculate the geographical location of the LDD 102 from location data collected by the GPS receiver 202. The controller 212 sends the geographical location calculated by the location detector 214 to the LMA via the transceiver 206.

A power supply 216 provides electrical power as needed to the other elements of the LDD 102 via electrical connections that are not shown in FIG. 2. It will be understood that certain components shown as distinct entities in FIG. 2 may be combined into integrated components. As a particular example, the memory 218 and the controller 212 could be constructed as a single processing element.

In other embodiments another technique may be employed for determining the current geographical position of the LDD 102, such as triangulation from wireless signals received by the transceiver 206 from three or more different wireless nodes or beacons.

Figure 3:
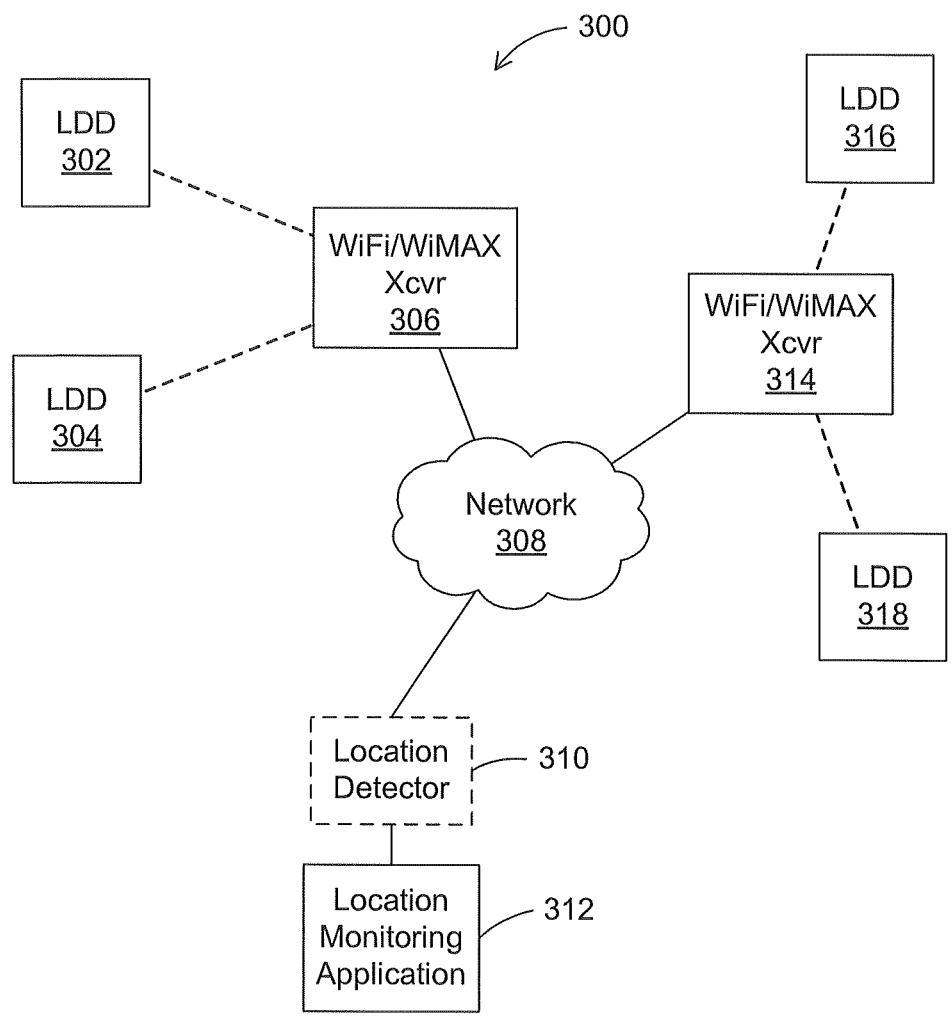
FIG. 3 presents a block diagram of a location monitoring system according to this disclosure.

FIG. 3 presents a block diagram of a location monitoring system 300 according to this disclosure. Location detection device (LDD) 302 and LDD 304 are in wireless communication with a transceiver 306. The transceiver 306 may be a WiFi transceiver or a WiMAX transceiver. LDD 316 and LDD 318 are in wireless communication with a transceiver 314, which may also be a WiFi transceiver or a WiMAX transceiver.

A network 308 communicatively couples the transceiver 306 and the transceiver 314 to a location monitoring application (LMA) 312. The network 308 may be a wireless network or a wireline network. Regardless of the type of network 308, both the transceiver 306, the transceiver 314, and the LMA 312 may couple to the network 308 either by wire or wirelessly. The LDDs 302 and 304 send location data to the LMA 312 via the transceiver 306 and the network 308. The LDDs 316 and 318 send location data to the LMA 312 via the transceiver 314 and the network 308.

In embodiments where the LDD 302 includes a location detector 214 (as shown in FIG. 2), the LDD 302 sends its geographic location to the LMA 312. In embodiments where the LDD 304 does not include a location detector 214, the system 300 includes a location detector 310 that is coupled to the network 308 and the LMA 312. The location detector 310 receives location data sent by the LDD 304 and calculates one or more geographical locations of the LDD 304. The location detector 310 sends the calculated geographical location(s) of the LDD 304 to the LMA 312.

In this way, the LMA 312 receives information about the geographical locations of the LDDs 302 and 304. The LMA 312 further receives information identifying the LDDs 302 and 304. The LMA 312 may archive the location and identification information, along with associated timestamps, to permit later queries such as where LDDs have been while not able to communicate with the LMA 312, where LDDs are located: in which processing facility, at what times and for how long. In other embodiments, a process control system (not shown in FIG. 3) receives asset geographic location information from the LMA 312 and activates alarms or performs other process control functions in response to the asset entering predefined areas of the processing facility, or being taken outside of predefined geographical regions while not in communication with the LMA 312.

While the location detector 310 and the LMA 312 are shown as separate components of the system 300, it will be understood that in other embodiments they may be integrated into a single component. In yet other embodiments, one or both of the transceivers 306 and 314, the location detector 310 and the LMA 312 may be integrated into a single component. In still other embodiments, the location detector 310 may be coupled to the LMA 312 via the network 308. While only two transceivers are shown in FIG. 3, it will be understood that any number of transceivers may link LDDs to the LMA 312.

Figure 4:
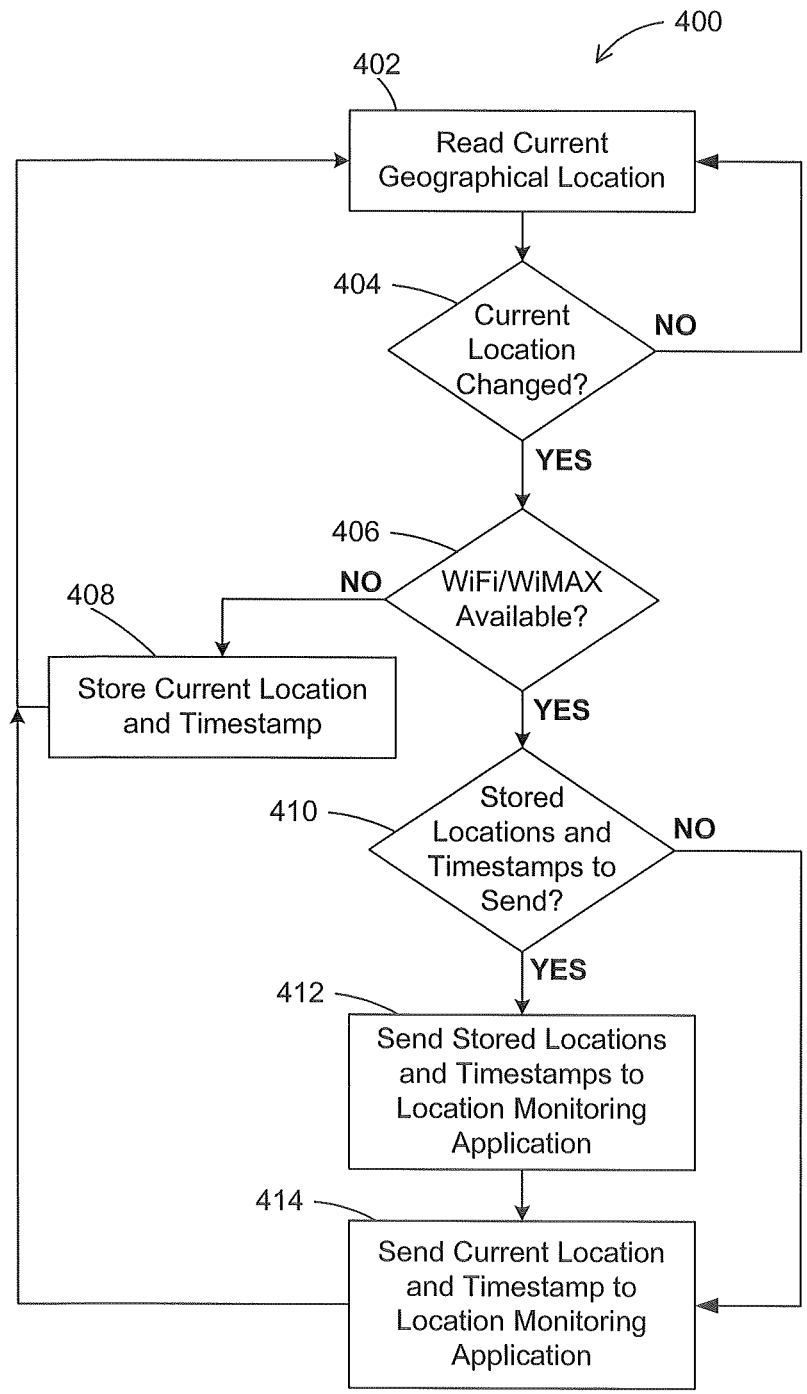
FIG. 4 presents a flow chart of a process for location detection according to this disclosure.

FIG. 4 presents a flow chart of a process 400 for location detection according to this disclosure. A location detection device (LDD) reads a current geographical location in step 402. In step 404, the LDD determines whether a rule determining how often it reports its location to a location monitoring application (LMA) had been triggered, for example, whether the LDD's current location has changed. If not, the LDD returns to step 402 to take another location reading.

If a location change or other rule trigger is found in step 404, then the LDD determines in step 406 whether communication with the LMA is possible. If not, the LDD stores its current location and any associated timestamp and returns to step 402.

If communication with the LMA is possible, then in step 410, the LDD determines whether any locations and timestamps are stored for deferred sending to the LMA. If not, then the LDD sends the current location and any timestamp to the LMA. If locations and/or timestamps are stored for deferred sending, then in step 412 the LDD sends the stored locations and timestamps to the LMA and, in step 414, sends the current location and any timestamp to the LMA.

It may be advantageous to set forth definitions of certain words and phrases used throughout this patent document. The term "couple" and its derivatives refer to any direct or indirect communication between two or more elements, whether or not those elements are in physical contact with one another. The terms "over," "above," and the like denote relative positions of two or more elements in a particular orientation and do not require direct contact between the elements. The terms "include" and "comprise," as well as derivatives thereof, mean inclusion without limitation. The term "or" is inclusive, meaning and/or.

The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
   reading a current geographical location of a location detecting device (LDD), the LDD coupled to an asset that is configured to move along one or more train tracks connecting a plurality of geographically separated processing facilities, the LDD configured to move along the one or more train tracks;
   determining whether communication with a location monitoring application (LMA) through a wireless node is possible, the wireless node associated with one of the processing facilities and comprising one of: a WiFi node and a WiMAX node;
   if communication with the LMA is not possible, storing the current geographical location and an associated time that the LDD is located at the current geographical location;
   repeating the reading, determining, and storing a plurality of times as the asset moves along the one or more train tracks, wherein the plurality of read geographical locations and associated times comprise a time-based route taken by the asset; and
   if communication with the LMA is possible, sending any stored geographical locations and associated times and the current geographical location and the associated time to the LMA when the LDD has moved a specified distance from a previous geographical location;
   wherein the reading of the current geographical location is repeated based on a location-based rule if communication with the LMA is not possible and based on a time-based rule if communication with the LMA is possible;
   wherein the geographical locations and associated times in the route are readable by the LMA in order to determine a location of the asset at a time when the LDD was not in communication with the LMA; and
   wherein the LMA is configured to transmit the geographical locations of the LDD and an indication that the LDD has entered a predefined area of a specified one of the processing facilities to a process control system that is associated with the specified processing facility and that is configured to perform a process control function in response to the indication.

2. The method of claim 1, wherein reading the current geographical location includes receiving a global positioning system (GPS) signal.

3. The method of claim 1, wherein reading the current geographical location is repeated until the current geographical location has changed from the previous geographical location and the determining, storing, and sending are not performed until a change in the current geographical location is detected.

4. The method of claim 1, wherein determining whether communication with the LMA is possible further includes determining whether the wireless node is coupled to the LMA.

5. The method of claim 1, wherein:
   storing the current geographical location and the associated time includes storing the current geographical location and the associated time in a memory.

6. The method of claim 5, wherein:
   the LDD is configured to store a plurality of geographical regions; and
   reading the current geographical location is repeated when the LDD determines that the LDD has moved from one stored geographical region to another stored geographical region.

7. An apparatus, comprising:
a GPS receiver;
a transceiver comprising one of a WiFi transceiver and a WiMAX transceiver; and
a controller adapted to:
read a current geographical location of the apparatus, the apparatus configured to be coupled to an asset that is configured to move along one or more train tracks connecting a plurality of geographically separated processing facilities;
determine whether communication with a location monitoring application (LMA) through a wireless node associated with one of the processing facilities and comprising one of a WiFi node and a WiMAX node is possible;
if communication with the LMA is not possible, store the current geographical location and an associated time that the apparatus is located at the current geographical location;
repeat the reading, determining, and storing operations a plurality of times as the asset moves along the one or more train tracks, wherein the plurality of read geographical locations and associated times comprise a time-based route taken by the asset; and
if communication with the LMA is possible, send any stored geographical locations and associated times and the current geographical location and the associated time to the LMA when the apparatus has moved a specified distance from a previous geographical location;
wherein the controller is adapted to repeat reading the current geographical location based on a location-based rule if communication with the LMA is not possible and based on a time-based rule if communication with the LMA is possible;
wherein the geographical locations and associated times in the route are readable by the LMA in order to determine a location of the apparatus at a time when the apparatus was not in communication with the LMA; and
wherein the LMA is configured to transmit the geographical locations of the apparatus and an indication that the apparatus has entered a predefined area of a specified one of the processing facilities to a process control system that is associated with the specified processing facility and that is configured to perform a process control function in response to the indication.

8. The apparatus of claim 7, wherein the controller is adapted to read the current geographical location of the apparatus via the GPS receiver.

9. The apparatus of claim 7, wherein the controller is adapted to:
repeat reading the current geographical location until the current geographical location has changed from the previous geographical location and not perform the determining, snoring, and sending until a change in the current geographical location is detected.

10. The apparatus of claim 7, wherein the controller is adapted to determine whether communication with the LMA is possible by determining whether communication with the wireless node is possible via the transceiver.

11. The apparatus of claim 10, wherein the controller is adapted to determine whether communication with the LMA is possible by determining whether the wireless node is coupled to the LMA.

12. The apparatus of claim 7, further comprising a memory, wherein the controller is adapted to:
store the current geographical location and the associated time in the memory.

13. The apparatus of claim 12, wherein the controller is adapted to:
store a plurality of geographical regions; and
repeat reading the current geographical location when the controller determines that the asset has moved from one stored geographical region to another stored geographical region.

14. A system, comprising:
a location monitoring application (LMA); and
a location detecting device (LDD) comprising:
a GPS receiver;
a transceiver comprising one of a WiFi transceiver and a WiMAX transceiver; and
a controller adapted to:
read a current geographical location of the LDD, the LDD configured to be coupled to an asset that is configured to move along one or more train tracks connecting a plurality of geographically separated processing facilities, the LDD configured to move along the one or more train tracks;
determine whether communication with the LMA through a wireless node associated with one of the processing facilities and comprising one of a WiFi node and a WiMAX node is possible;
if communication with the LMA is not possible, store the current geographical location and an associated time that the LDD is located at the current geographical location;
repeat the reading, determining, and storing operations a plurality of times as the asset moves along the one or more train tracks, wherein the plurality of read geographical locations and associated times comprise a time-based route taken by the asset; and
if communication with the LMA is possible, send any stored geographical locations and associated times and the current geographical location and the associated time to the LMA when the LDD has moved a specified distance from a previous geographical location;
wherein the controller is adapted to repeat reading the current geographical location based on a location-based rule if communication with the LMA is not possible and based on a time-based rule if communication with the LMA is possible;
wherein the geographical locations and associated times in the route are readable by the LMA in order to determine a location of the asset at a time when the LDD was not in communication with the LMA; and
wherein the LMA is configured to transmit the geographical locations of the LDD and an indication that the LDD has entered a predefined area of a specified one of the processing facilities to a process control system that is associated with the specified processing facility and that is configured to perform a process control function in response to the indication.

15. The system of claim 14, wherein the controller is adapted to read the current geographical location of the apparatus via the GPS receiver.

16. The system of claim 14, wherein the controller is adapted to:
repeat reading the current geographical location until the current geographical location has changed from the previous geographical location and not perform the determining, staring, and sending until a change in the current geographical location is detected.

17. The system of claim 14, wherein the controller is adapted to determine whether communication with the LMA is possible by determining whether communication with the wireless node is possible via the transceiver.

18. The system of claim 17, wherein the controller is adapted to determine whether communication with the LMA is possible by determining whether the wireless node is coupled to the LMA.

19. The system of claim 14, wherein the LDD further comprises a memory and the controller is adapted to:
   store the current geographical location and the associated time in the memory.

20. The system of claim 19, wherein the controller is adapted to:
   store a plurality of geographical regions; and
   repeat reading the current geographical location when the controller determines that the asset has moved from one stored geographical region to another stored geographical region.

\* \* \* \* \*